Oct. 26, 1937. R. R. HALL 2,097,185
FISHING TACKLE AND ROD BOX
Filed May 3, 1937 2 Sheets-Sheet 2
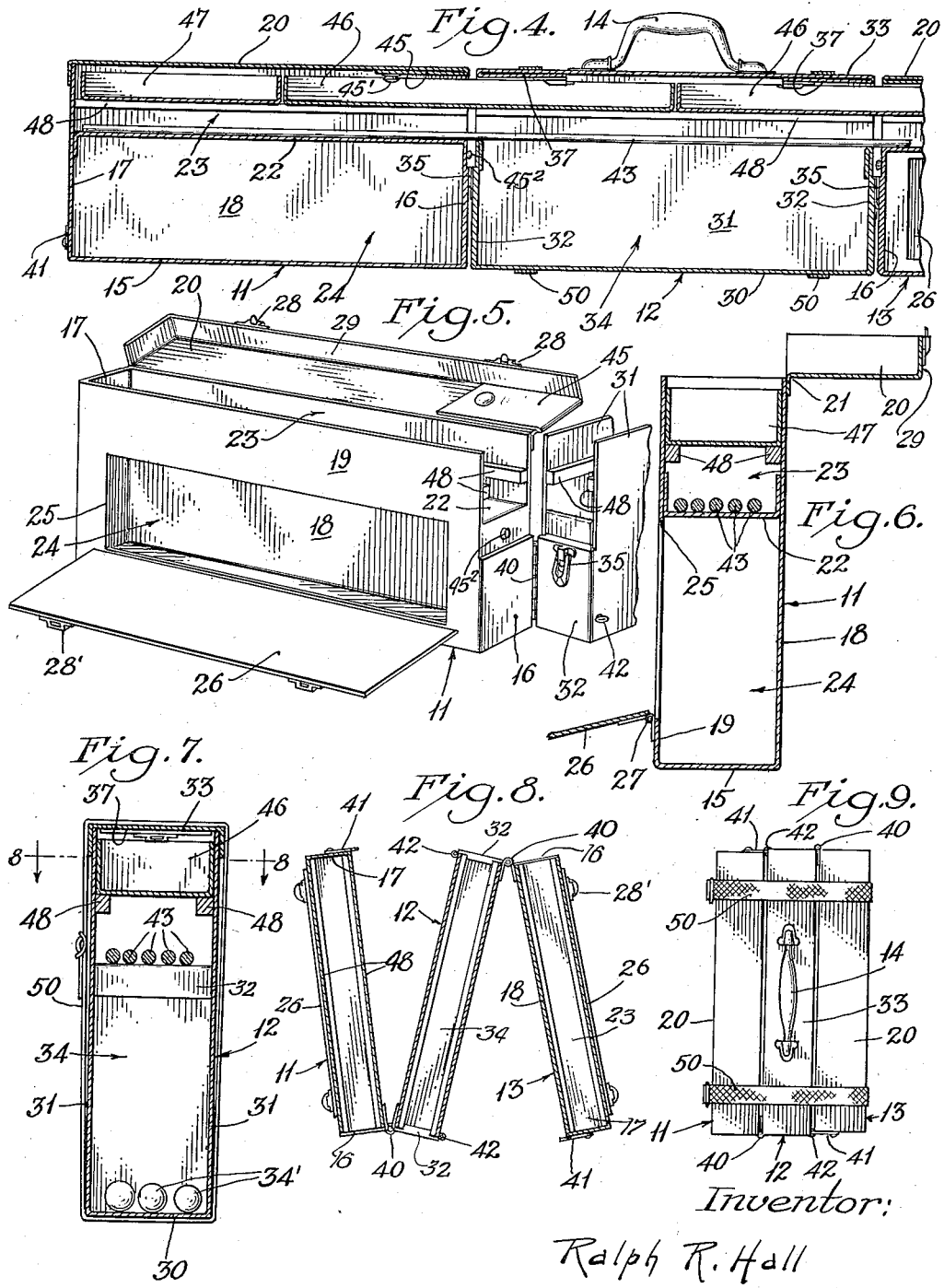
Inventor:
Ralph R. Hall
by Albert Scheible
Attorney.

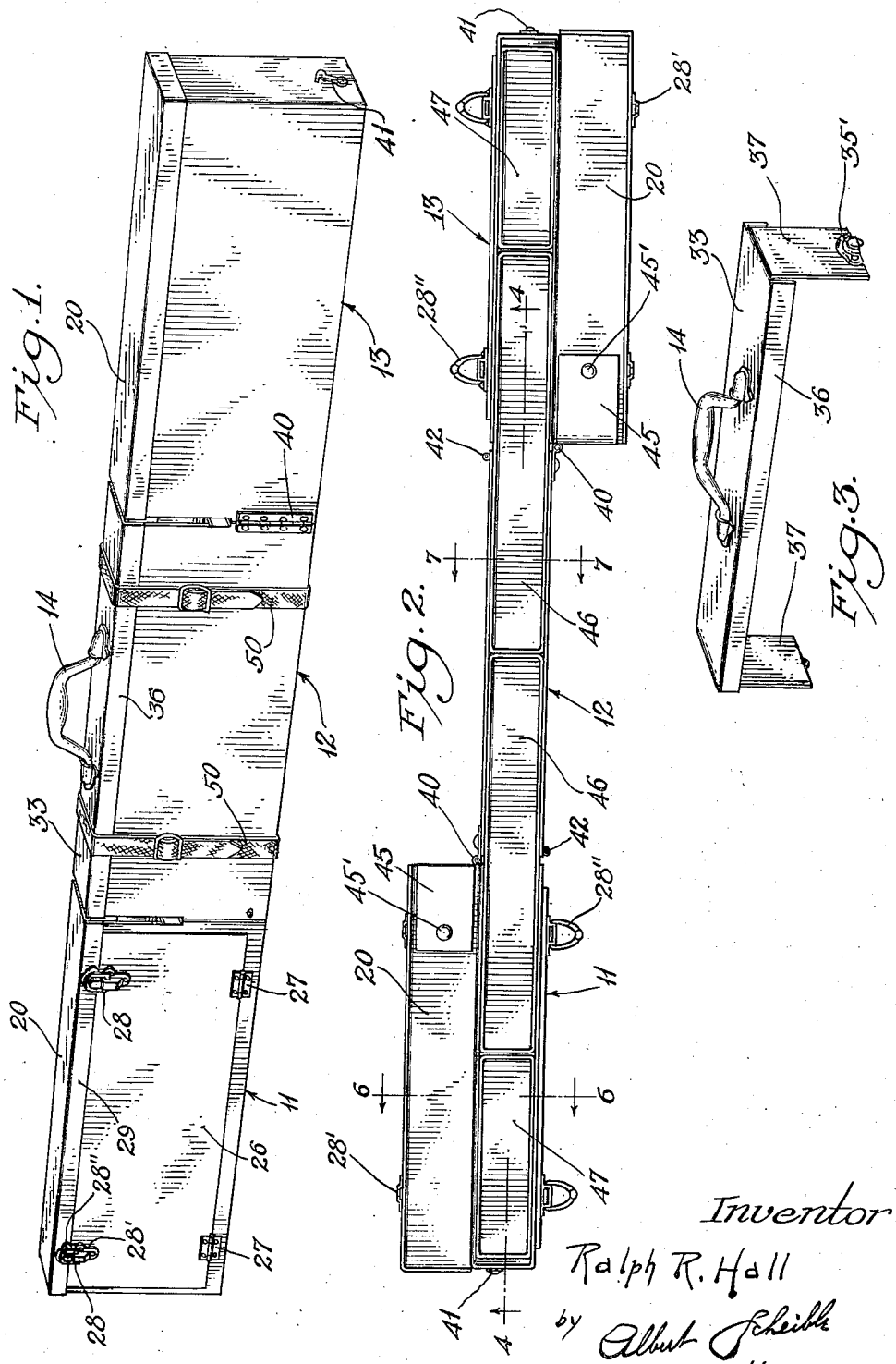

Patented Oct. 26, 1937

2,097,185

UNITED STATES PATENT OFFICE 2,097,185

FISHING TACKLE AND ROD BOX

Ralph R. Hall, Chicago, Ill.

Application May 3, 1937, Serial No. 140,307

16 Claims. (Cl. 43—31)

The invention relates generally to a fisherman's packing case for carrying fishing tackle, short casting rods, sectional fishing rods, bait and other accessories.

The primary object of the present invention is to provide a fisherman's packing case comprising casing sections which are shiftably related so that in one relationship the case can house short rods or rod sections, in addition to the fishing tackle, bait and other small items, whereas in another relationship the sections are compactly arranged to form a relatively short case adapted for convenient placement and use in a fishing boat.

A further object is to provide a packing case or carrier of the aforesaid general character in which the sections are permanently interhinged and adapted to be interlocked as a rigid unit in either of the above recited relative dispositions of the sections.

Another object is to provide a sectional carrying case of the above characteristics with removable trays adapted to be disposed for holding the sections in alinement when the case is being carried in its extended relation, and adapted also to be re-arranged to permit shifting the sections into compact form, and also to afford convenient access to the trays when the sections are disposed in either of their above recited relationships.

A further object is to provide such a sectional packing case wherein the several sections are constructed and arranged for conveniently affording access to all of the contents, other than the rods, when the sections are disposed in either of their aforesaid relationships.

Other objects and advantages will become apparent from the following description taken in connection with the accompanying drawings, in which:

Fig. 1 is a perspective view of a fisherman's packing case embodying my invention, the case being arranged in its extended form wherein it is adapted for being carried while housing one or more fishing rods or rod sections in addition to fishing tackle, bait and other accessories.

Fig. 2 is a plan of the case shown in Fig. 1 with the cover of the central section removed and the covers of the end sections swung open.

Fig. 3 is a perspective view of the cover for the central section of the case.

Fig. 4 is a fragmental, vertical, longitudinal section of the case taken along the line 4—4 of Fig. 2.

Fig. 5 is a perspective view of an end section and a fragment of the central section of the case showing the sections in a position intermediate their extended relation and their compact relation, with the sections opened.

Fig. 6 is an enlarged transverse sectional view of one of the end sections of the case, the section being taken along the line 6—6 of Fig. 2.

Fig. 7 is an enlarged transverse sectional view of the central section of the case and its cover, the section being taken along the line 7—7 of Fig. 2.

Fig. 8 is a view partly in plan and partly in horizontal section taken along the line 8—8 of Fig. 7 and showing on a reduced scale a position occupied by the sections while they are being shifted from their extended to their compact relation.

Fig. 9 is a plan on a reduced scale showing the case in its compact relation.

In the illustrated three-section embodiment, my fisherman's packing case 10 comprises three shiftably related sections 11, 12 and 13 adapted to be arranged in an extended, end to end or aligned relationship, as shown in Figs. 1, 2, and 4 when fishing rods are to be housed and carried in the case; and also adapted to be arranged in a compact, side by side relationship as shown in Fig. 9 when the case is to be used in a fishing boat. In either its extended or compact relation, the case may be carried by means of a handle 14, which, when three sections are used, is secured to the top of the central section 12.

The several sections of the case are preferably of the same general shape and dimensions and may be formed from any suitable material such as fiber board or sheet metal. Thus, in the form illustrated, the two end sections 11 and 13 are of the same form, each having a bottom wall 15, end walls 16 and 17, side walls 18 and 19 and a top wall or cover 20 hinged at 21 to upper edge of the side wall 18. Within each end section is a horizontal partition 22 dividing the section into an upper compartment 23 accessible through the open top of the section when the cover 20 is opened, and a lower compartment 24 to which access is had through an opening in the side wall 19.

In providing for such access the side wall 19 has a relatively large opening 25 therein practically coextensive with the compartment 24 and closed by a door 26. The door 26 is preferably mounted on the wall 19 by hinges 27 at its lower edge, and latches or fasteners 28 are provided to secure the door in its closed position. The fasteners 28, as herein shown, each have one element 28' mounted on a depending flange 29 of the cover 20 and the other element 28" of each fastener mounted on the door 26 adjacent its upper edge. Thus the fasteners 28 serve to secure both the cover 20 and the door 26 in their closed positions. Ordinarily, the lower compartments 24 are used to house the supply of bait and other material to which access must be had while the case is resting on the bottom of a boat, and with this mounting of the doors 26, the bait and other material contained in the compartments 24 are fully visible and readily accessible when the doors 26 are opened.

The central section 12, in the form of the invention illustrated, is constructed with bottom and side walls 30 and 31, end walls 32 of less height than the side walls and a removable top wall or cover 33 to which the handle 14 is attached. Thus the section 12 provides a single compartment 34 which is relatively large and adapted to receive rod handles 34¹, reels and other miscellaneous equipment. Access to the compartment 34 is had through the open top of the section 12 after removal of the cover 33 and the hereinafter mentioned trays. This cover 33 is removably secured in place on the central section by latches or fasteners 35 (see Fig. 5), located at the ends of the section 12. As shown in Fig. 3, the cover 33 has side flanges 36 to overlap the upper edges of the side walls 31 of the central section, and independently movable end flaps 37 arranged to close openings in the ends of the central section. Upon each flap 37 is mounted one element 35' of the fastener 35, the other element of which is mounted on the end wall 32 of the central section. The end walls 32 of the central section are substantially as high as the end walls 16 of the end sections, the purpose of which will be presently explained.

In order that the case may be arranged selectively and easily in the extended relation of Figs. 1, 2, and 4, or in the compact relation of Fig. 9, the sections 11, 12, and 13 are consecutively interhinged together to permit appropriate relative movement, and means are provided for maintaining the several sections in either one of these two relations. Thus, as shown in the drawings, the end sections 11 and 13 are connected to diagonally opposite vertical corners of the central section 12 by hinges 40, these hinges being secured in each instance to the side wall 18 of the end section adjacent the corner formed by the wall 18 and the end wall 16 thereof. With this arrangement of the hinges 40, the end sections 11 and 13 may be folded against opposite sides of the central section 12 as indicated in Figs. 5, 8, and 9, and when thus positioned, the doors 26 on the side wall 19 are disposed on the outer sides of the case so that the user may have ready access to the compartments 24. In folding the case to its compact relation, the sections are moved through the position seen in Fig. 8 to the relation seen in Fig. 9, in which relation they are fixed by means such as hooks 41, located on the end walls 17 of the end sections 11 and 13 and engageable with eyes 42 fixed on the end walls 32 of the central section 12.

When the sections 11, 12 and 13 are in their extended and aligned relation as seen in Figs. 1, 2, and 4, the two upper compartments 23 of the end sections are aligned and, of course, the large compartment 34 of the central section 12 extends from end to end of its section; and in accordance with the present invention, the adjacent end walls of the sections are so formed that the compartment 34 communicates at its opposite ends with the two upper compartments 23, thereby forming a single elongated upper compartment extending throughout the length of the three sections and adapted to receive one or more short casting rods and the sections of jointed fishing rods as seen in Fig. 4 at 43.

The particular formation of the end walls 16 of the end sections 11 and 13 is illustrated in Figs. 4 and 5 of the drawings and as here shown the end wall 16 extends from the bottom 15 to the horizontal partition 22, thereby providing an end wall for the compartment 24. Thus the ends of the sections 11 and 13 above the walls 16 are open down to the partition 22. To close said open ends when the case is folded to its compact relation, an end flap 45 is provided on that end of each cover 20 which is located at the open end of the compartment 23, which flap may be swung down to cover the open end thereof. Coacting, snap fastener members 45', 45² are provided respectively on the end flaps 45 and on the end walls 16 to secure the flaps 45 in closing relation to the compartments 23. However, when the case is extended, the flaps 45 and 37 are folded inwardly beneath their covers as shown in Fig. 4 to afford a continuous elongated space from end to end of the extended case.

Similarly, the end walls 32 of the central section 12 terminate at the height of the partitions 22, and the open ends thus provided may be closed by the end flaps 37 of the cover 33. The flaps 37 may also be folded inwardly under the cover 33 to provide for the reception of the mentioned trays 46 and parts of fishing rods, as shown in Fig. 4.

As hereinbefore stated, means is provided for maintaining the sections in their aligned, extended relation, and this means preferably comprises a plurality of trays 46 and 47 adapted, in one relative positioning to permit folding of the sections to the compact relation and in another relative positioning to hold the several sections rigid against such movement. To support the trays 46 and 47, similar, horizontal, oppositely disposed cleats 48 are provided on the inner faces of the side walls of each of the sections, the cleats being spaced about midway of the height of the compartments 23 so as to leave a substantial space beneath the trays as shown in Figs. 4 to 6 for the storage of the fishing rods. Fish hooks, sinkers and other small accessories may be stored in the trays.

I preferably provide two trays 46 of substantially the same length as the compartments 23 and two trays 47 are provided, each of approximately one-half this length, the total length of the four long and short trays being substantially the same as the total length of the two compartments 23 and the compartment 34. Thus, to maintain the aligned extended relation of the sections after the rod sections have been placed in the sections on the partitions 22, the two long trays 46 are positioned on the cleats 48 as shown in Figs. 2 and 4, with one-half of each said tray contained in the section 12, and the other ends of the trays extending into the adjacent sections 11 and 13. The short trays 47 are then located on the cleats 48 in the ends of the compartments 23 adjacent the remote ends of the sections 11 and 13.

From the above, it is apparent that each long tray acts as a brace or strut along two hinged together sections, whereby to hold the sections rigid in their extended relation.

After thus locating the trays 46 and 47, the covers 20 of the end sections are closed and locked, and the cover 33 of the central section is placed in position thereon, the flaps 37 and 45 being folded beneath their covers as shown in Fig. 4. The cover 33 is then secured in place on the central section as by means of straps 50, thus enabling the case to be carried by its handle 14.

When the case is to be folded to its compact relation, the straps 50 are removed, the covers opened, the trays removed, and after the removal of the fishing rods, the two long trays 46 are placed in the end sections 11 and 12, whereas the two short trays 47 are placed end to end in the central section 12. The covers may be replaced and the case may then be folded to the form of Fig. 9, the ends being closed by flaps 37 and 45 and the sections being secured together by the hooks 41 and eyes 42 and by the straps 50 as seen in Fig. 9. In either relationship of the trays and the sections of the case, the trays serve to reinforce and strengthen the case and to resist lateral compression of the case when the straps 50 are tightened about the case.

For using the compacted case in a fishing boat, the straps 50 are removed so that the covers 20 and 33 may be opened at will to obtain access to the smaller items of tackle, such as hooks, sinkers and leaders contained in the several trays 46 and 47. The short trays 47 may, of course, be readily lifted out of the central section when the user desires access to the reels, handles and other tackle contained in the compartment of the central section. The bait and other tackle in the two compartments 24 are also conveniently obtainable through the openings controlled by the doors 26, which are always exposed at the outside of the case.

With my thus constructed packing case, the entire equipment needed by the user can readily be housed within and conveniently carried by this single case, since the trays co-operate with the interhinging of the consecutive sections to hold these sections in their tandem alinement of Fig. 1. Then, when the rod sections have been taken out and the trays have been rearranged in relation, the compacted case can again be strapped as in Fig. 9 for convenient handling and so as to occupy comparatively little space in a fishing room. Moreover, the side doors 26 permit ready access to the lower compartment when the case is elongated, so that the fisherman does not need to loosen the carrying straps 50 when he procures bait or the like.

I claim as my invention:

1. A fisherman's packing case comprising, in combination, three rectangularly shaped sections of similar size, means consecutively interhinging the said sections together to permit relative movement thereof from an extended relation wherein said sections are disposed end to end in alined relation to a compact relation wherein said sections are disposed side by side; the outward sides of the two end sections which are exposed, when said sections are in their said compact relation, having door openings therein; and a door normally closing said openings and adapted to be opened to afford access to the interior of said end sections.

2. A fisherman's packing case as per claim 1, in which the section end walls which are adjacent when the sections are in their said alined relation extend to a lesser height than the other walls of the sections, so as to permit fishing rod sections to extend through the middle section and into each of the two other sections; and separate covers for the said section; the said covers having movable flaps adapted to close the section end openings above the said end walls of lesser height when the sections are disposed in their said side by side relation.

3. A fisherman's packing case as per claim 1, in which the section end walls which are adjacent when the sections are in their said alined relation extend to a lesser height than the other walls of the sections, so as to permit fishing rod sections to extend through the middle section and into each of the two other sections; and separate covers for the said section; the said covers having movable flaps adapted to close the section end openings above the said end walls of lesser height when the sections are disposed in their said side by side relation; and means associated with each of the said flaps for releasably latching that flap in its said opening-closing disposition.

4. A fisherman's packing case as per claim 1, in which the section end walls which are adjacent when the sections are in their said alined relation extend to a lesser height than the other walls of the sections, so as to permit fishing rod sections to extend through the middle section and into each of the two other sections; each of the end sections having a horizontal position alining with the upper ends of the said walls of lesser height for supporting the end portions of such fishing rod section.

5. A fisherman's packing case as per claim 1, in which the section end walls which are adjacent when the sections are in their said alined relation extend to a lesser height than the other walls of the sections, so as to permit fishing rod sections to extend through the middle section and into each of the two other sections; opposed horizontal ledges fastened to the two side walls of each section, at a uniform elevation above the tops of the said end walls of lesser height and below the upper edges of the said side walls; and trays supported by the said ledges, the trays being of such sizes that they can be disposed either for permitting the sections to be in their said compact relation, or that two of the trays will extend across the junctures of the middle section with the end sections so as to maintain the three sections in their said end to end relation.

6. A fisherman's packing case comprising three sections of counterpart rectangular prismatic section, disposed in an extended end to end relation when being carried by the user; hinges connecting the diagonally opposite edges of the middle section respectively with the two end sections to permit the end sections to be swung respectively against the opposite sides of the middle section, the adjacent end walls of the three sections presenting alined openings at their tops when the sections are in their said extended relation; alined horizontal ledges mounted within the said sections below their tops and above the lower edges of the said openings, and four trays seated consecutively on the said ledges and conjointly extending for substantially the entire interior length of the casing when the sections are in their said extended relation; two of the trays corresponding in length to the interior length of one of the sections, and each of the other trays being only half as long as one of the said two trays.

7. A fisherman's packing case as per claim 1, in which the section end walls which are adjacent when the sections are in their said alined relation extend to a lesser height than the other walls of the sections, so as to permit fishing rod sections to extend through the middle section and into each of the two other sections; a cover hinged to the upper end of a side wall of each end section, the said cover having a flap at the cover end which is adjacent to the middle section when the sections are in their said extended relation; the said flap being hinged to the cover proper to permit it to be folded under the cover when the sections are in extended relation, and also to permit the flap to be folded under the said cover when the sections are disposed in their said compacted relation.

8. A fisherman's packing case as per claim 1, in which the section end walls which are adjacent when the sections are in their said alined relation extend to a lesser height than the other walls of the sections, so as to permit fishing rod sections to extend through the middle section and into each of the two other sections; and a cover detachably fitting the middle section, the said cover having two flaps respectively hinged to its ends to permit the said flaps to be folded under the cover when the sections are in their said extended relation, and also to permit the said flaps to depend from the cover for closing the end openings in the central section when the sections are in their said extended relation.

9. A fisherman's packing case comprising, in combination, a plurality of similarly shaped sections of similar size; and means hinging said sections together to provide for relative folding movement from an extended relation wherein said sections are longitudinally aligned in tandem, to a compact relation wherein said sections are disposed side by side; the side of one of the sections which is exposed when the sections are in their compact relation having a door opening therein with a door therefor adapted to be opened to provide for access to the interior of its section, and the end walls of said sections which are adjacent, when the sections are in said extended relation, having openings in similar positions to permit fishing rod sections to be conjointly housed by more than one section.

10. A fisherman's packing case comprising a plurality of elongated sections of similar size, each open at the top and hinged together at their ends for shifting movement to an extended end to end relation or to a compacted side by side relation, said sections having open tops, and individual covers for the open tops of said sections adapted to be secured in closing relation to said sections or to be opened to afford access to the setcions, each of said sections having a compartment accessible through the open tops of said sections when the covers are opened and extending from end to end in its section, said compartments being positioned so that said compartments are aligned when said sections are in said extended relationship, said sections having apertures in the adjacent ends of the said compartments to permit fishing rod sections to extend through the middle section and into each end section.

11. A fisherman's packing case as per claim 10, wherein said last mentioned means includes a plurality of trays for holding fishing tackle and removably supported within and adjacent the tops of said sections so as to be accessible when said covers are opened, said trays being adapted to be rearranged to permit movement of the sections to their compact relation or to maintain said sections in their extended relationship.

12. A fisherman's case of the character described comprising a plurality of elongated sections hinged together at their ends for shifting movement to an extended end to end relation, or to a compact, side by side relation, said sections having open tops and being provided with individual covers which when opened afford access to the interior of their sections, each of said sections having a compartment accessible through the top of the section and extending from end to end in its section, said compartments being positioned so as to be aligned at least in part when said sections are in said extended relation, said sections having low walls at the ends which are adjacent when the case is extended, above which are openings placing said aligned portions of said compartments in communication so as to provide a long space for the reception of a fishing rod, a plurality of trays removably positioned within and adjacent to the tops of said compartments so as to be accessible when said covers are opened, and means for supporting said trays with a substantial space beneath the trays so as to allow ample room for such a fishing rod, said trays being adapted to be rearranged to different longitudinal positions to permit movement of the sections to their compact relation or to maintain said sections in their extended relation.

13. A case of the character described comprising three open top sections of similar size and shape, a pair of trays each of a length adapting the same to fit into the top of one of said sections, a pair of short trays, the total length of the two short trays being substantially equal to the length of one of the other trays, means for supporting said trays adjacent to the open tops of said sections, horizontal partitions in two of said sections spaced downwardly a substantial distance from said tray supporting means, the two said sections each having one end wall terminating at the height of said partition to leave one end of each of said sections open above its partition, and both end walls of the other section terminating at the same height so as to leave the upper portion of both ends of this section open, means hinging the said open ends of the two said sections to opposite ends of said other section, and means for closing the open tops and ends of said sections or for closing the open tops while leaving said open ends unobstructed.

14. A fisherman's packing case as per claim 13 wherein the partitions in said two sections provide compartments therein below said partitions, and each of said two sections having an opening in one side wall and a door for closing the opening.

15. A fisherman's packing case comprising, in combination, a plurality of open top sections hinged together to provide for movement of the sections from a compact, side by side relation, to an extended, end to end relation, the adjacent ends of said sections having low end walls providing aligned openings above those end walls which are adjacent to each other when the sections are in said extended relation, shiftable covers for said sections, flaps on the adjacent ends of said covers for closing said openings when said sections are in said compact relation, said flaps being adapted to be moved to positions parallel to and beneath the covers when said openings are to be uncovered, and means for securing said covers and said flaps in their closed positions.

16. A case of the character described comprising a plurality of similarly shaped open top sections hinged together to provide for relative folding movement from an extended relation wherein the sections are disposed end to end in aligned relation to a compact relation wherein said sections are disposed side by side, one side of one of the sections which is exposed when the sections are in their compact relation having an opening therein affording access to the interior of its section, and a door hinged along the lower edge of said opening for closing the same, said sections having low end walls constituting the ends of compartments which are adjacent to each other when the case is in its extended relation, there being openings above said end walls extending down from the tops of the sections for a substantial distance to provide for housing a fishing rod extending through more than one section, shiftable covers for said sections having releasable securing means for fastening said covers in closing relation to the open tops of said sections, the cover on said one of said sections being pivoted at the upper edge of said one section remote from said door, and having one element of its securing means mounted on its swinging edge and the other element mounted on the upper edge of said door.

RALPH R. HALL.